Patented Sept. 30, 1952

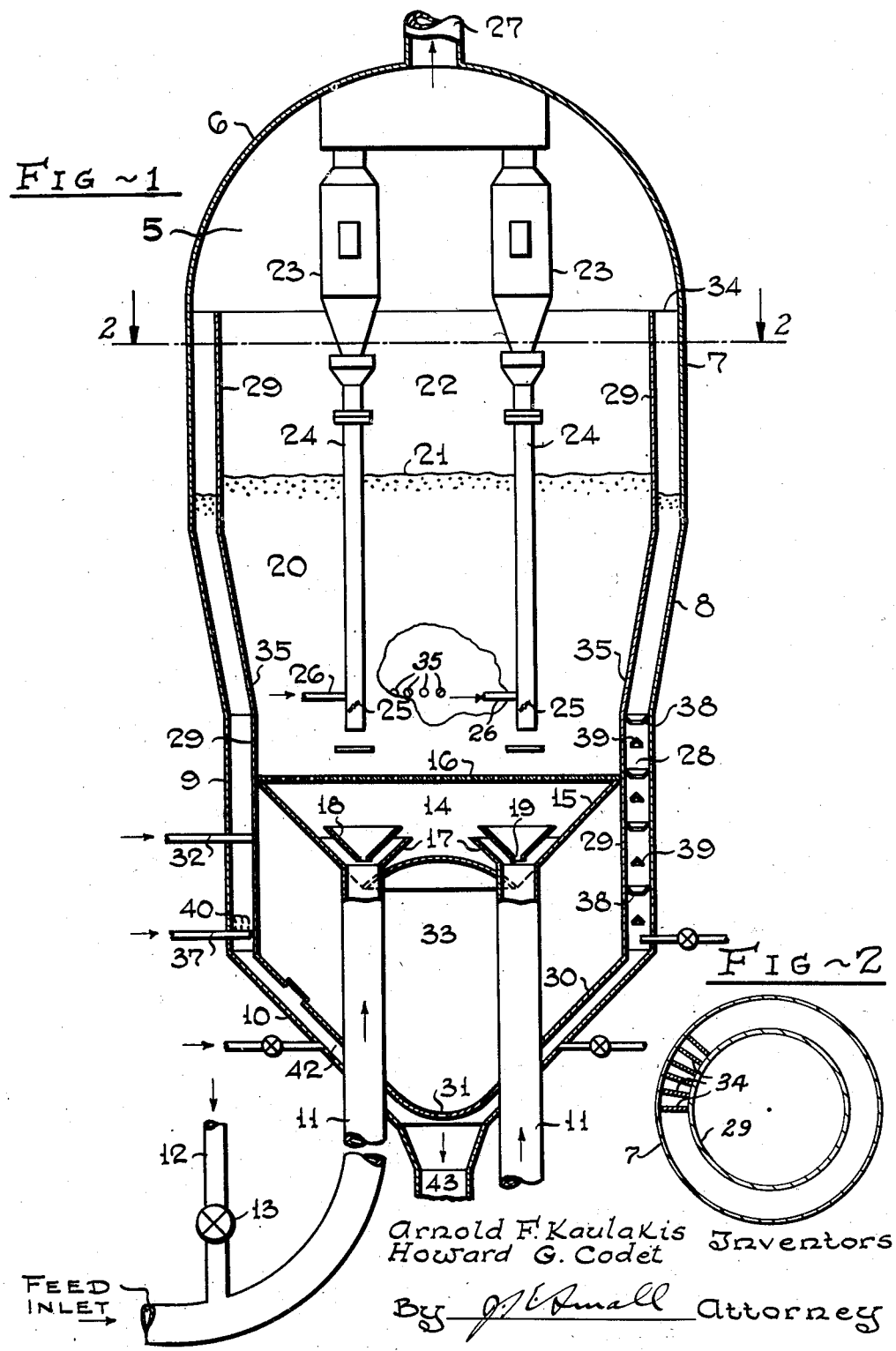

2,612,437

UNITED STATES PATENT OFFICE 2,612,437

CATALYST REACTION VESSEL

Arnold F. Kaulakis, Roselle, and Howard G. Codet, Mountainside, N. J., assignors to Standard Oil Development Company, a corporation of Delaware Application February 5, 1948, Serial No. 6,446

4 Claims. (Cl. 23—288)

This invention pertains to apparatus for carrying out catalytic reactions wherein finely divided catalyst particles are held in suspension in the reactant materials, and particularly to means for stripping adsorbed fluidal materials from the solid catalyst particles utilized in the catalytic conversion of hydrocarbons.

There has been developed in recent years in certain catalytic operations, a method which is commonly referred to as the fluid catalyst method or technique in which finely divided solid catalyst particles are carried through a reaction zone in a stream of vapors undergoing reaction. This method or technique is applicable to a wide variety of catalytic reactions and while for purposes of illustration this invention will be specifically described in connection with the catalytic cracking of hydrocarbons, it is to be understood that the invention is not limited thereto, but may be used in other catalytic processes or in other catalytic conversions of hydrocarbons where it is desired to remove vapors or gases from dense, fluidized, liquid-simulating mixtures of solid catalyst particles and gaseous fluids.

In general, in the fluid catalyst method the vaporous reactants and catalyst are introduced into the bottom of the reaction vessel, passed upwardly therethrough and are discharged into separation equipment in which the catalyst is separated from the vaporous products and returned to the reaction vessel preferably after regeneration. In a modified or improved design of catalytic cracking unit, catalyst and reactants are continuously supplied to the reaction vessel and the finely divided catalysts or contact particles are maintained in a dense, dry, fluidized, liquid-simulating condition in the lower portion of the reaction vessel wherein hydrocarbons in vaporous or gaseous form are contacted with the solid particles. The hydrocarbon vapors or gases pass upwardly through the dense fluidized mixture in the reaction zone and the vaporous products are taken overhead from the reaction zone.

During the catalytic cracking of hydrocarbons and also in other catalytic conversion of hydrocarbon materials, coke or carbonaceous materials are deposited on the catalyst or contact particles thereby reducing or destroying their catalytic activity. The contaminated or spent catalyst must be continuously withdrawn from the reaction zone and regenerated before being reused in the cracking or other catalytic operation. The contaminated or spent catalyst particles are continuously withdrawn as a dense fluidized mixture from the lower portion of the reaction zone and regenerated by contacting with air or other regeneration gas at elevated temperatures to burn off the carbonaceous deposits.

The contaminated, spent catalyst or contact particles withdrawn from the lower portion of the reaction zone contain entrained hydrocarbon vapors or gases and before regenerating the particles it is preferred practice to remove the entrained hydrocarbons in a stripping or purging operation. The efficient stripping of hydrocarbon vapors from the spent catalyst in the fluid catalytic cracking operation remains an important and pressing problem even after several years of commercial operation of fluid catalyst cracking plants. Most of the commercial units are limited in their throughput by the capacity of their carbon burning systems yet 10 to 30% of the oxygen supplied to the regenerative system goes to the combustion of gases or strippable hydrocarbons carried to the regenerator by the spent catalyst. Besides greatly reducing the feed throughput, these strippable hydrocarbons, amounting anywhere from 0.5 to 1.5 wt. % on feed, represent a sizable loss of potential products. The present invention relates to an improved design for a stripping or purging section or zone for a fluidized solids reactor.

In accordance with the present invention the mixture of catalyst or contact particles and the hydrocarbons or other reactants are introduced into the bottom portion of a reaction vessel through a hollow conical member provided with a perforated distribution plate member. Long, narrow cells are arranged substantially vertically adjacent the inner wall of the reaction vessel. Catalyst particles are withdrawn from the dense bed or active reaction zone through these cells and are contacted with steam or other stripping agent in order to remove the strippable hydrocarbons that are adsorbed or carried by the catalyst particles into the stripping section. The cells extend from substantially the bottom of the reaction vessel to a point well above the maximum dense bed level in the reactor. Inlet ports for the discharge of catalyst from the dense bed into the long narrow stripping cells may be of any desired shape, circular, semi-circular, rectangular, triangular or what not and are arranged at any desired level between the perforated distribution plate and the minimum dense bed level. Ordinarily the inlet ports are of such dimensions that a pressure drop through the port of about 0.2 to 3.0 lbs. per sq. in. is produced. The catalyst level in the stripping cells is ordinarily a little lower than the dense bed level in the reactor and the cells extend a sufficient distance above the dense bed level to provide a catalyst disengaging space. The provision of a pressure drop between the dense bed and the stripping cell avoids recirculation of the catalyst from the stripping cell back into the dense bed or active reaction zone and extension of the cells upwardly into the dilute phase results in the discharge of the stripping vapors into the dilute phase rather than into the dense bed. The stripper cells in accordance with the present invention insure equal distribution of the catalyst to the several cells by reason of the fact that the catalyst inlet orifices exert a leveling effect upon the flow of catalyst to the cells during reactor surges or steam failures in the stripper cells and extension of the radial baffles which divide the annular space into long, narrow cells upwardly at least as high as the maximum catalyst bed level in the stripping zone prevents flow or mixing of catalyst from cell to cell. If the baffles or the cells only extended to some point below the level of catalyst in the stripping section, a common reservoir of catalyst would be formed at the upper part of the stripping section and, if the flow of stripping agent to a particular cell should stop for any reason, flow of catalyst through that cell would become excessive and the common reservoir would be rapidly drained through that cell without any stripping occurring.

Steam or other inert stripping gas is introduced into the bottom portion of each stripping zone preferably at more than one point or in more than one direction so that the distribution of the stripping agent is substantially uniform over the entire cross-section of the stripping cell. The individual stripping cells may, if desired, be provided with baffles for improving or increasing the contact of catalyst particles and stripping agent.

Reference is made to the accompanying drawing illustrating the present invention.

In the drawing, Fig. 1 represents vertical elevation, partly in section, of an apparatus embodying the present invention with part of the fluidized solids bed broken away to show some of the restricted inlet ports leading into the annular stripping zone; and Fig. 2 is a horizontal cross section taken on line 2—2 of Fig. 1 with parts omitted to show a portion of the cellular construction of the annular stripping section.

Referring to the drawing, the reaction vessel 5 comprises an upper hemispherical dome section 6, a large cylindrical section 7, a frusto conical section 8, a small cylindrical section 9 and a frusto conical bottom section 10 and is provided with inlet lines 11 for introducing a mixture of reactants and catalyst or contact particles. The catalyst particles are introduced into line 11 from a standpipe or the like 12 which is equipped with a valve 13 for controlling the rate at which the catalyst particles are supplied to line 11 from the standpipe 12.

The suspension of solid catalyst or contact particles in reactant vapors is passed through feed lines 11 into an inlet chamber 14 comprising an upwardly flared wall member 15 and a grid member or perforated distribution plate 16 at its upper end. The discharge ends of the feed lines 11 are preferably flared as at 17 and a conical baffle 18 is arranged over each outlet in order to distribute the charge in the inlet chamber 14. A vent hole 19 is provided at the apex of the conical baffle plates 18 in order to prevent accumulation and stagnation of catalyst in said baffles. In the form of the apparatus shown in the drawing, the reaction vessel is circular in cross section and the grid member 16 is circular and centrally arranged in the reaction vessel. The diameter of the grid member 16 is less than the internal diameter of the smaller cylindrical section 9 of the reaction vessel to provide an annular passageway for the withdrawal of catalyst particles from the lower portion of the reaction vessel as will be hereinafter described in greater detail.

The velocity of the gaseous reactant fluid passing upwardly in the reaction vessel 5 is preferably so controlled as to maintain the solid contact or catalyst particles as a dense, fluidized, liquid-simulating, dry mixture or bed 20 having a level indicated at 21. The vaporous reaction products leaving the dense bed 20 entrain a small amount of solid catalyst particles forming a dilute phase or suspension designated at 22 in the upper portion of the reaction vessel 5 namely in the upper portions of the large cylindrical section 7 and in the dome-shaped section 6.

The reaction products and entrained catalyst particles are passed through separating means 23 arranged in the upper portion of the reaction vessel. This separating means which may be a cyclone separator or the like, separates most of the entrained solid catalyst particles from the vaporous reaction products. The solid catalyst particles separated in the cyclones 23 are returned to the dense bed 20 through the dip legs or pipes 24 which extend below the upper level 21 of the dense bed 20. Valves 25 for controlling the return of catalyst particles to the dense bed and steam lines 26 for fluidizing the separated catalyst particles may be provided in the dip legs 24. The vaporous reaction products leaving the separating means 23 pass overhead through line 27 and may then be passed to any suitable equipment to effect further removal of entrained solids and to recover the desired products. In the catalytic cracking or conversion of hydrocarbons the vaporous reaction products are passed to a fractionating system to separate gasoline or motor fuel from gases and higher boiling hydrocarbon constituents.

Removal of catalyst particles from the dense phase or bed 20 is effected through the stripping zone generally indicated at 28 which is formed between the inner wall of the small cylindrical section 9 and a smaller diameter concentric vertically arranged sleeve 29 which surrounds the distribution plate 16 and extends some distance above and also below the said distribution plate. The upper end of the wall member 15 is preferably secured as by welding to the grid plate 16 as well as the sleeve member 29. Secured to the bottom of sleeve member 29 is a conical baffle member 30 for reducing the effective volume below the inlet chamber 14. The conical member 30 is arranged substantially equidistant from the lower conical section 10 of the reactor and is provided with a vent hole 31. A steam bleed line 32 is provided for supplying steam or the like, to the chamber 33 formed between walls 15, 29 and 30 in order to prevent the accumulation of fine catalyst particles in said chamber.

The annular space 28 formed between the inner wall of cylindrical section 9 and the cylindrical sleeve 29 is subdivided into a plurality of long and narrow stripping zones or cells by means of radial baffles 34. In accordance with the present invention these stripping zones or cells are extended upwardly well above the maximum dense bed catalyst level in the reaction zone. This may be readily accomplished by extending the sleeve 29 surrounding the distributor plate 16 upwardly the desired distance above the dense bed catalyst level 21 such as to 34. This extension of the sleeve 29 can be made in one or more sections and it may conform to the shape of the inner walls of the reaction vessel and be spaced a uniform distance therefrom as shown in Fig. 1, or it may, if desired, be arranged at different distances from the inner wall by making it of uniform size and shape. It could, for example, be tapered gradually to provide a relatively narrow stripping gas exit port at the top of the cells or that portion of the inner wall of the cell extending above the dense bed catalyst level could be flared outwardly to reduce the cross-sectional area of the stripping cells or flared inwardly to increase the cross-sectional area of the cells. The radial baffles which divide the annular space 28 into relatively long and narrow stripping cells or zones are also extended upwardly generally to the same height as the inner wall member 29 although any height greater than the dense bed level in the stripper cells will suffice. Ordinarily the dense bed catalyst level in the stripping cells is a little lower than the dense bed catalyst level in the reactor.

Inlet ports 35 are arranged in the walls 29 at a point above the distributor plate 16 and below the minimum dense bed catalyst level for the discharge of catalyst particles from the dense bed 20 into the stripping cells. The openings or inlet ports 35, which may be of any desired shape are of such size as to produce a pressure drop through the port of from about 0.2 to 3.0 lbs. per sq. in. By providing this pressure drop through the inlet ports and extending the stripping cells above the dense bed catalyst level substantially uniform distribution of catalyst to the several cells and more uniform stripping of the catalyst can be achieved. This is due to the fact that the restricted catalyst inlet ports even out the flow of catalyst to the strippers under abnormal conditions such as surges in the reactor bed level or failure of supply of stripping agent to one or more stripper cells.

The number of baffles and accordingly the number of stripping zones or cells provided may be varied as desired. A commercial unit having an overall height of 53 feet from the bottom of the smaller cylindrical section to the center line of the cyclone inlet and having an internal diameter at the said smaller cylindrical section 9 of 30 feet, has been divided into 44 stripping zones. However, 70 or even more stripping zones may be provided if desired. Inlets 37 for the supply of steam or other stripping agent are arranged at the bottom of each of the stripping cells. The stripping cells may if desired be provided with suitable baffles 38 and 39 in order to increase the mixing or contact of the upflow of stripping or purging gas and the downflowing spent or contaminated particles as shown in the right hand stripping cell of Fig. 1. Although adequate stripping can be obtained in an unbaffled cell such as is shown in the left hand stripping cell of Fig. 1, particularly if the stripping gas inlet 31 is provided with a number of nozzles 40 to distribute the stripping agent uniformly over the cross-section of the stripping cell.

The catalyst particles discharged from the stripping cells flow downwardly in the annular conical section 42 and are discharged into standpipe 43 which leads to a regenerator or the like for revivifying the spent, stripped catalysts in known manner. As is well known in the art, the standpipe 43 is provided with a slide valve (not shown) to control the rate of withdrawal of solids from the dense bed 20.

The operation of the apparatus in accordance with the present invention will now be described in connection with the catalytic cracking of hydrocarbons. In such catalytic cracking operations the reactant fluid or feed stock comprises hydrocarbons such as, gas oil, reduced crude, petroleum oil, whole crude and heavy naphthas in liquid or vapor form or partly in liquid and partly in vapor form. The catalyst or contact particles may comprise acid treated bentonitic clay, synthetic silica-alumina or silica-magnesia gels or mixtures thereof with activators and promoters such as oxides of zinc, calcium, thorium, boron, zirconium, vanadium, chromium, molybdenum and the like or any other suitable cracking catalyst. The catalyst particles may be of any desired form, microspheroidal particles being particularly convenient. The major proportion of the catalyst particles are ordinarily from about 20 to 200 microns in diameter.

Powdered catalyst such as a silica-magnesia cracking catalyst supplied from standpipe 12 and relatively heavy hydrocarbon oil such as, gas oil supplied through the feed inlet in vaporized or partially vaporized condition are passed through inlet lines 11 into the inlet chamber 14 at temperatures between 800 and 1100° F. preferably at about 975° F. The catalyst to oil ratio may vary between about 5:1 and about 30:1 by weight. The mixture of powdered catalysts and hydrocarbon vapors is passed from the inlet chamber 14 through the distribution plate or grid 16 into the reactor proper to form a fluidized, dry, liquid-simulating mixture or dense bed 20 in the reaction vessel. The velocity of the vaporized hydrocarbon materials through the bed is from about 0.6 to 2.0 ft. per second and the density of the catalyst in the dense bed 20 varies from about 10 to 30 lbs. per cu. ft.

The vaporous reaction products leaving the dense bed 20 carry along small amounts of the catalyst fines forming a dilute phase 22. The reaction products are discharged through the cyclone separators 23 for separating catalyst fines which are returned to the dense bed 20 through dip legs 24, while vaporous reaction products pass overhead through line 27 to suitable recovery or treating equipment.

During the cracking operation the catalyst particles become spent by the deposition of coke or carbonaceous materials thereon. The spent or contaminated catalyst particles in fluidized condition and containing entrained hydrocarbon vapors and gases are discharged continuously through the restricted inlet ports 35 into the stripping space 28. As the spent catalyst particles descend through the stripping cells they are contacted countercurrently with steam supplied through line 37. By discharging the spent catalyst from the dense bed through the restricted inlet ports 35 a pressure drop is taken thereby obviating the danger of recirculation of catalyst particles from the stripping cell back into the dense bed and also evening out the flow of catalyst into the cells during reactor surges and/or failures of the supply of stripping agent to one or more of the cells. Since the stripping cells extend well above the maximum dense bed catalyst level, the stripping agent and the stripped hydrocarbons are discharged into the dilute phase, thereby avoiding dilution of the vapors undergoing cracking and consequent reduction in capacity of the reactor. The stripped catalyst particles pass into standpipe 43 whence they are discharged into a regenerator wherein the coke or the carbonaceous deposits on the catalyst are burned off rendering the catalyst particles suitable for recycling to standpipe 12 and thence into the reaction vessel.

While the improved stripper arrangement has been specifically described in connection with the catalytic cracking of hydrocarbon it is to be understood that the apparatus may be used for removing volatile material from other solid contact particles in other reactions such as the dehydrogenation of butane or butylene fractions, aromatization of naphtha fractions, coking of heavy residues and the like; and also may be used generally in other reactions involving contact of solid particles with gaseous or vaporous reactants. For example, the apparatus could also be applied in other known treatments such as the oxidation of alcohol to aldehydes or acids or to the preparation of anhydrous hydrogen chloride.

While the best form of apparatus known has been described, it is to be understood that this by way of illustration only and that various changes and modifications may be made without departing from the spirit of this invention.

What is claimed is:

1. An apparatus of the character described including a vessel adapted to contain a fluidized bed of solid particles and for contacting gaseous fluid and finely divided solid particles and having a top outlet for gaseous fluid and a bottom outlet for solid particles, an inlet chamber in the bottom portion of said vessel for the supply of gaseous fluid and finely divided solids to said vessel, a horizontally arranged perforated member at the upper portion of said inlet chamber, said perforated member being concentric with said vessel and of smaller diameter, a vertically disposed sleeve extending above said perforated member and secured to the periphery thereof, said sleeve extending a substantial distance upwardly in said vessel above the maximum level of the dense fluidized bed of solid particles adapted to be maintained in said vessel and being spaced from the inner wall of said vessel to provide an annular space for the withdrawal of solids, a multiplicity of radial baffles of substantially the same height as said sleeve and arranged between the outer wall of said sleeve and the inner wall of said vessel for dividing said annular space into a multiplicity of elongated narrow parallel cells, said vertical sleeve being provided with a multiplicity of inlet ports arranged entirely around said vertical sleeve and above said horizontally arranged perforated member but below the minimum level of the dense fluidized bed of solids adapted to be maintained in said vessel for the discharge of solids directly from the dense fluidized bed adapted to be maintained in said vessel into each of said cells, each of said inlet ports being of such size to produce a substantial pressure drop through the ports to effect substantial uniform distribution of the solids to each of said cells, means for introducing a stripping agent into the lower portion of each of said cells below the locus of said inlet ports whereby solid particles passing down through said cells are stripped of volatile material by the upflowing stripping agent and the stripping agent and stripped-out material are conducted by each of said cells into the upper portion of said vessel above the maximum level of the fluidized bed of solid particles adapted to be maintained in said vessel, the bottom of said cells communicating with said bottom outlet in said vessel for removal of solid particles from said vessel.

2. Apparatus as defined in claim 1 wherein the dimensions of said inlet ports in said sleeve are such as to produce a pressure drop through said ports of from 0.2 to 3.0 lbs. per sq. inch.

3. An apparatus according to claim 1 wherein baffle means are provided in each of said cells for increasing the contacting between the upflowing stripping agent and the downflowing solids in each of said cells.

4. Apparatus as defined in claim 3 wherein the dimensions of said inlet ports in said sleeve are such as to produce a pressure drop through the ports of from 0.2 to 3.0 lbs. per sq. inch.

ARNOLD F. KAULAKIS.
HOWARD G. CODET.

REFERENCES CITED

The following references are of record in the file of this patent:

UNITED STATES PATENTS

| Number | Name | Date |
|---|---|---|
| 2,415,755 | Ogorzaly et al. | Feb. 11, 1947 |
| 2,415,756 | Le Roi et al. | Feb. 11, 1947 |
| 2,436,464 | Van Dornick | Feb. 24, 1948 |